Figure 1:
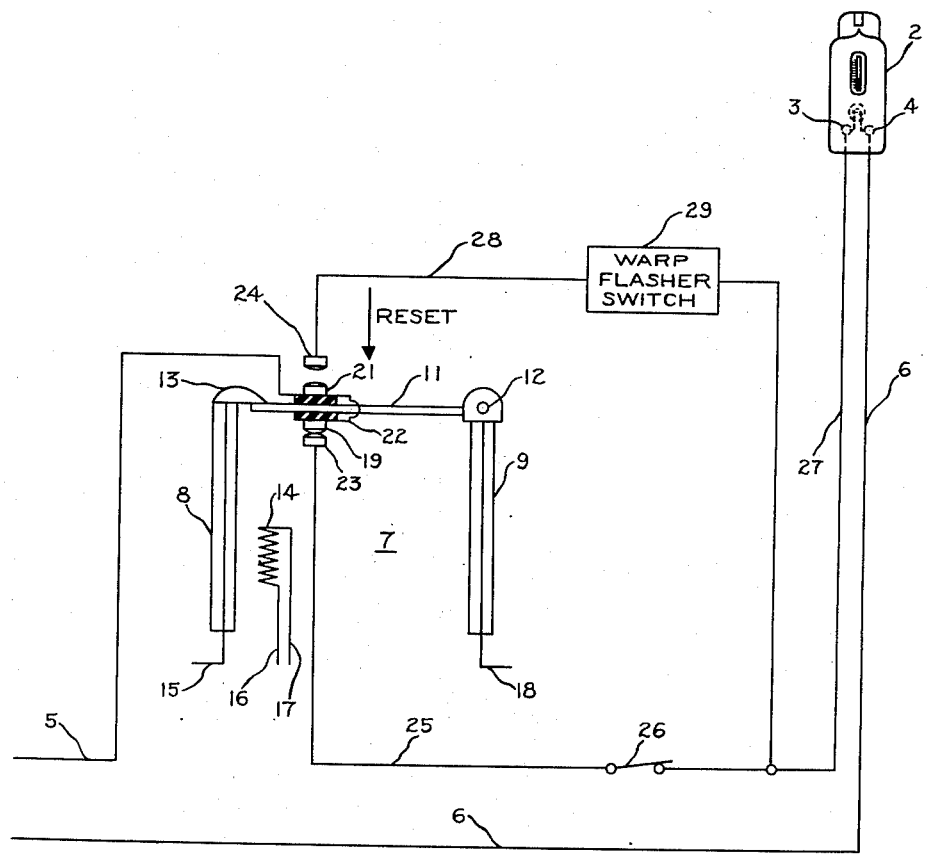

June 10, 1952 G. V. ELTGROTH 2,599,703
LOCKOUT WARNING SYSTEM FOR HOME HEATING APPARATUS
Filed Sept. 2, 1949

Inventor
GEORGE V. ELTGROTH
By Robert F. Peile
Attorney

Patented June 10, 1952

2,599,703

UNITED STATES PATENT OFFICE 2,599,703

LOCKOUT WARNING SYSTEM FOR HOME HEATING APPARATUS

George V. Eltgroth, Philadelphia, Pa., assignor to Bendix Aviation Corporation, Baltimore, Md., a corporation of Delaware Application September 2, 1949, Serial No. 113,840

2 Claims. (Cl. 177—311)

The present invention relates to improvements in automatic control systems for domestic heating apparatus and particularly to a novel means for producing a visible signal whenever the heating apparatus is locked-out of service in response to the supervisory control of conventional safety components of automatic control systems.

Frequently, during the operation of domestic heating apparatus, certain irregularities of performance create conditions in the furnace that could result in dangerous "puffs" and all conventional automatic control systems include a safety switch for locking-out the heating apparatus from further operation in the event of such irregularities of performance. The safety switches normally open circuit the control system and are so constructed that the circuit cannot be closed until the safety switch is manually reset. Such an arrangement permits inspection of the heating apparatus to detect the irregularities of performance so that same can be remedied by whatever service measures are necessary.

Whenever the heating apparatus is locked-out of operation, it frequently happens that the locked-out condition is not detected until the heating or hot water system manifests such change, to the resulting discomfort of the users of the equipment. Thus, if the heating apparatus were locked-out during the winter, the condition may go undetected until the house cooled to a temperature not suitable for occupant's comfort. Also, if the heating system is adapted for the popular summer-winter hookup whereby the domestic hot water is heated by the heating apparatus, a locked-out condition in the summertime could remain undetected until the user noted the absence of hot water. In either case, the normal delay attendant to service of the equipment would only serve to further inconvenience the users of the equipment and it becomes apparent that there is a need for some means of giving an immediate signal or warning of a locked-out condition.

Accordingly, it is an object of the present invention to provide novel means of producing a visible warning signal whenever a domestic heating installation is locked-out of operation.

The above-stated object can be carried out through the use of an illuminated thermostat provided with appropriate circuits for controlling the illuminations thereof. The application of LeRoy D. Kiley, S. N. 107,951, filed August 1, 1949, entitled "Illuminating Means for Thermostats," shows and describes an illuminated thermostat ideally adapted to serve as a visible signal of a locked-out burner system. The present invention provides means for producing a steady illumination of the thermostat corresponding to normal burner operation and a flashing illumination of the thermostat whenever the burner is locked-out of operation. By the addition of two sets of contacts appropriately controlled by conventional safety switches, energizing circuits for the illuminating means of the thermostat are provided to selectively produce the steady and flashing illumination referred to above. By having the illumination energizing circuits under the control of the safety switch, a visible signal of "lock-out" is perceptible simultaneously with the operation of the safety switch.

In the drawings, the single figure shows a schematic arrangement of the necessary circuitry and parts for carrying out the objects of the invention, and will serve to illustrate the invention when taken in conjunction with the detailed specification recited below.

Referring to the drawing, there is shown an illuminated thermostat 2 having a pair of terminals 3, 4 for connection of the illuminating means with a source of electric energy. Mounted within the thermostat 2 (shown in dotted lines) is a source of illumination connected across the terminals 3, 4. Thermostat 2 may be of the type shown and described in the application of LeRoy D. Kiley, S. N. 107,951, filed August 1, 1949, and entitled "Illuminating Means for Thermostats." Leads 5, 6 are connected to terminals 3, 4, respectively, the lead 6 being connected directly to terminal 4, and the lead 5 ultimately being connected to terminal 3 through a special switching arrangement to be described below.

The special switching arrangement comprises a safety switch 7 of a well-known type comprising a pair of spaced parallel bimetals 8, 9 with a latch bar 11 pivoted to the bimetal 9 at 12 and biased for clockwise rotation about this point. The safety switch 7 is of a type shown and described in the application of Paul G. Frerer, S. N. 21,402, filed April 16, 1948, now Patent No. 2,567,702 and entitled "Automatic Burner Control." The latch bar 11 is normally restrained from such motion, however, by the engagement of its end with the latch trip 13 affixed to the bimetal 8, which has an electrical heater resistor 14 thermally associated therewith. The bimetals 8, 9 are so arranged that their deflections in the presence of temperature variations have the same sense whereby the distance between their free ends remains the same in the presence of ambient temperature changes despite the flexing of the respective bimetals. If an electric current be passed through the heater resistor 14, however, the bimetal 8 is heated independently of the bimetal 9, whereupon the ends of bimetals 8 and 9 assume a diverging position to disengage the latch bar 11 from the latch trip 13, permitting it to move quickly to the open position where it remains until re-set to open the burner control circuit, not shown, through the safety switch 7. Leads 15, 16, 17, 18 connect the bimetal 8, heater resistor 14, and bimetal 9, respectively, to an automatic burner control circuit of the type shown and described in the aforesaid application of Paul G. Frerer.

It is to be understood that when the safety switch 7 opens, the burner associated therewith is permanently locked-out of operation until the switch 7 is manually re-set.

In addition to performing its safety lock-out function, switch 7 also performs a special switching function in the illuminating circuits of thermostat 2. Thus, the latch bar 11 carries a pair of moving contacts 19, 21, suitably insulated from the latch bar 11, the contacts being electrically connected through the jumper lead 22 and connected to one side of the source of electric energy through lead 5. The moving contacts 19, 21 cooperate with a pair of fixed contacts 23, 24 respectively, to establish alternate illuminating circuits for thermostat 2.

In the position shown, which is the normal operating position, the contact 19 engages the contact 23, the contact 23 being connected to the terminal 3 by means of lead 25 through the normally closed manually operable switch 26 and lead 27. Thus, an illuminating circuit for the thermostat 2 is provided as follows: Lead 5, contact 21, jumper lead 22, contact 19, contact 23, lead 25, switch 26, lead 27, terminal 3, source of illumination, terminal 4, and lead 6. Under these conditions, the thermostat 2 will be continuously illuminated, thus indicating normal burner operating conditions.

Contact 24, which cooperates with contact 21, is connected to terminal 3 of thermostat 2 by means of lead 28, through a suitable warp flasher switch 29, and lead 27. Switch 29 can be arranged to open and close the circuit through it at any predetermined time interval, such as once per second.

If for any reason, the safety switch 7 is opened to lock-out the burner from further service, the normal illuminating circuit will be interrupted by virtue of separation of contacts 19 and 23. However, when the switch 7 opens, contacts 21 and 24 close and an alternate illuminating circuit for the thermostat 2 is established, as follows: lead 5, contact 21, contact 24, lead 28, warp flasher switch 29, lead 27, terminal 3, source of illumination, terminal 4, and lead 6. With this alternate circuit established, the warp flasher switch 29 will cause the souce of illumination in the thermostat 2 to emit a flashing light and this flashing light will serve as a signal that the burner is locked-out, permitting investigation prior to an undesirable cooling off of the house or the hot water supply.

The switch 26 is provided to permit manual interruption of the normal illumination circuit when same is not required, such as in the summer time. Opening of the switch 26 will not disturb the operation of the alternate illuminating circuit for the thermostat 2.

Thus, there is provided a first circuit for continuously energizing the source of illumination and a second circuit for periodically energizing the source of illumination. In this manner, a steady light from thermostat 2 will indicate normal conditions of operation, whereas a flashing light from the thermostat 2 will serve as a signal of abnormal conditions which have resulted in the burner being "locked-out" from further operation.

What is claimed and desired to be secured by United States Letters Patent is:

1. In heating apparatus of the type having means for locking-out the heating apparatus from further operation upon the occurrence of irregularities in performance of the heating apparatus, a lock-out warning system therefor, comprising: a thermostat having a source of illumination associated therewith for producing a visible signal; said thermostat being located in the space to be heated by said heating apparatus whereby the occupants of said space may conveniently observe said signal; a first circuit for continuously energizing said source of illumination; a second circuit including means for periodically energizing said source of illumination; and means operated by the locking-out means when it is not in locking-out condition for completing the first circuit and operated when it is in locking-out condition for opening the first circuit and completing the second circuit.

2. In heating apparatus of the type having a safety-switch for locking-out the heating apparatus from further operation upon the occurrence of irregularities in performance of the heating apparatus, a lock-out warning system therefor, comprising: a thermostat; a source of illumination carried by said thermostat; said thermostat being located in the space to be heated by said heating apparatus whereby the occupants of said space may conveniently observe said thermostat; a first circuit for continuously energizing said source of illumination and including a first pair of normally closed contacts; a second circuit having means for periodically energizing said source of illumination and including a second pair of normally open contacts; and means actuated by said safety-switch for opening said first pair of contacts and closing said second pair of contacts when said heating apparatus is locked-out from further operation.

GEORGE V. ELTGROTH.

REFERENCES CITED

The following references are of record in the file of this patent:

UNITED STATES PATENTS

| Number | Name | Date |
| --- | --- | --- |
| 1,785,397 | Shoenberg et al. | Dec. 15, 1930 |
| 1,854,786 | Dicke | Apr. 19, 1932 |
| 2,223,530 | Putman | Dec. 3, 1940 |